(12) United States Patent
Palazzolo et al.

(10) Patent No.: US 8,234,867 B2
(45) Date of Patent: Aug. 7, 2012

(54) TURBOCHARGER SYSTEM FOR INTERNAL COMBUSTION ENGINE WITH INTERNAL ISOLATED TURBOCHARGER OIL DRAINBACK PASSAGE

(75) Inventors: Christopher Kelly Palazzolo, Ann Arbor, MI (US); Patrick Sexton, Ypsilanti, MI (US); Christopher Cowland, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1026 days.

(21) Appl. No.: 12/145,866

(22) Filed: Jun. 25, 2008

(65) Prior Publication Data

US 2009/0320471 A1 Dec. 31, 2009

(51) Int. Cl.
*F02G 3/00* (2006.01)
*F02B 33/44* (2006.01)
(52) U.S. Cl. .......................................... 60/624; 60/605.3
(58) Field of Classification Search .................... 60/599, 60/605.1, 605.3; 184/6.11, 6.16; 123/195, 123/568.11; 277/591, 594, 596, 598, 637
See application file for complete search history.

(56) References Cited

U.S. PATENT DOCUMENTS

| | | | | |
|---|---|---|---|---|
| 4,469,078 A * | 9/1984 | Speer et al. | | 123/564 |
| 4,583,367 A * | 4/1986 | Kapfer et al. | | 60/605.3 |
| 4,643,137 A | 2/1987 | Choushi | | |
| 4,716,735 A * | 1/1988 | Ruf et al. | | 60/605.3 |
| 5,079,921 A | 1/1992 | McCandless | | |
| 5,139,349 A | 8/1992 | Nakano | | |
| 5,392,604 A * | 2/1995 | Nikula et al. | | 60/605.3 |
| 5,392,751 A * | 2/1995 | Matsubara et al. | | 123/559.1 |
| 5,544,486 A * | 8/1996 | Lu | | 60/599 |
| 6,125,799 A | 10/2000 | Van Son | | |
| 6,305,168 B1 * | 10/2001 | Furukawa | | 60/605.1 |
| 6,431,157 B1 * | 8/2002 | Marcil | | 123/568.11 |
| 6,484,683 B2 | 11/2002 | Zielke | | |
| 6,915,634 B2 * | 7/2005 | Dumas et al. | | 60/605.3 |
| 7,043,915 B2 * | 5/2006 | Anello | | 60/605.3 |
| 7,165,402 B2 * | 1/2007 | Blom | | 60/605.3 |
| 7,784,442 B2 * | 8/2010 | Lester et al. | | 123/193.5 |
| 2001/0048062 A1 | 12/2001 | Murao | | |
| 2005/0257521 A1 | 11/2005 | Anello | | |
| 2007/0056281 A1 * | 3/2007 | Arvan et al. | | 60/598 |
| 2007/0175456 A1 | 8/2007 | Tally | | |
| 2007/0234997 A1 | 10/2007 | Prenger | | |
| 2008/0223329 A1 * | 9/2008 | Preimesberger et al. | | 123/195 A |
| 2009/0078240 A1 * | 3/2009 | Diggs et al. | | 123/559.1 |
| 2009/0095875 A1 * | 4/2009 | Anello | | 248/637 |
| 2009/0320469 A1 * | 12/2009 | Palazzolo et al. | | 60/624 |

FOREIGN PATENT DOCUMENTS

| | | |
|---|---|---|
| DE | 10218354 A1 | 11/2003 |
| GB | 2424450 A | 9/2006 |

* cited by examiner

*Primary Examiner* — Thomas Denion
*Assistant Examiner* — Cameron Setayesh
(74) *Attorney, Agent, or Firm* — Julia Voutyras; Alleman Hall McCoy Russell & Tuttle LLP

(57) ABSTRACT

A turbocharger system for an internal combustion engine includes a turbocharger with a utility pedestal extending between the turbocharger and the hard point associated with the cylinder block. The utility pedestal includes a mounting pad for attaching the combined turbocharger and pedestal assembly to an engine, as well as oil and coolant supply passages for supplying the turbocharger with coolant and lubricating oil under pressure. An internal, isolated, turbocharger oil drainback passage conducts waste oil from the turbocharger to a crankcase sump without permitting the waste oil to contact the engine's moving parts.

20 Claims, 6 Drawing Sheets

TURBOCHARGER SYSTEM FOR INTERNAL COMBUSTION ENGINE WITH INTERNAL ISOLATED TURBOCHARGER OIL DRAINBACK PASSAGE

CROSS REFERENCE TO RELATED APPLICATIONS

None.

BACKGROUND OF THE INVENTION

1. Field of the Invention

The present invention relates to a turbocharger system including not only a turbocharger, but also a mounting pedestal arranged with utilities needed to operate and position the turbocharger, including an internal, isolated turbocharger lubricating oil drainback passage.

2. Related Art

Turbocharging has been used for a number of years with internal combustion engines. Although early turbochargers were often cooled primarily by air, as well as by the flow of oil through the turbocharger's bearings, later model turbochargers, especially larger turbochargers and those installed in heavy duty engines, generally utilize coolant circulating from the engine's cooling system through the turbo, and then back to the engine's main cooling system. Of course, turbochargers also require an oil supply and drain utilities to lubricate the bearings associated with the turbocharger. Needless to say, the provision of a source of coolant and a source of oil, with both being under pressure, as well as draining the oil and coolant from the turbocharger and returning these fluids separately to the engine, has necessitated a good deal of external plumbing. Unfortunately, external fluid connections and associated pipes and hoses cause problems because hoses are known to leak and are subject to damage which may be accelerated by the high temperatures prevailing within engine compartments. Moreover, aside from durability issues, the need for external plumbing for turbochargers increases the space required by the turbocharger in an already crowded underhood environment.

Turbochargers mounted on engines typically consume a good deal of space for another reason. Because known mounting arrangements are not susceptible to locating the turbocharger close to the engine block, turbochargers must be spaced away from the engine to permit the insertion of the turbochargers' fasteners. Moreover, known turbocharger mounting systems increase radiated noise because of a lack of rigidity and because of the dimensional problems associated with their usage.

It would be desirable to provide a turbocharger, including a mounting system having integral supply and return passages for coolant and lubricating oil, and with the lubricating oil return passage being routed to enhance the effectiveness of the engine's lubrication system.

BRIEF DESCRIPTION OF THE INVENTION

According to an aspect of the present invention a turbocharger system for an internal combustion engine having a cylinder block includes a turbocharger and a utility pedestal extending between the turbocharger and a mounting associated with the engine. The utility pedestal includes a mounting pad for the pedestal and an oil supply passage for conveying lubricating oil under pressure from a portion of the engine, such as the cylinder block, to the turbocharger. A return oil passage conveys lubricating oil from the turbocharger to a lubrication system incorporated within the engine. A coolant supply passage conveys coolant under pressure to the turbocharger, and a coolant return passage, configured at least in part within the utility pedestal, conveys coolant from the turbocharger to a cooling system incorporated within the engine. According to another aspect of the present invention, the coolant return passage may include a passage configured, at least in part, within the engine's cylinder block, as well as within the utility pedestal.

According to another aspect of the present invention the coolant return passage from the turbocharger may be configured so as to convey the coolant to a mixing chamber within which the coolant from the turbocharger is mixed with coolant flowing from at least one cylinder head.

According to another aspect of the present invention, the return oil passage from the turbocharger conveys waste oil from the turbocharger to a crankcase sump without allowing the waste oil to contact moving parts within the engine.

According to another aspect of the present invention least a portion of the turbocharger return oil passage is configured from parent metal within the engine's cylinder block.

According to another aspect of the present invention, a hard point associated with the cylinder block for mounting the turbocharger includes a generally planar mounting pad configured on a portion of the cylinder block, with the mounting pad of the utility pedestal having a lower mating surface matched to the generally planar mounting pad. The cylinder block's mounting pad is configured with lubricating oil and coolant utilities.

According to another aspect of the present invention, a turbocharger's generally planar mounting pad may be configured upon a cylinder block within a valley defined by the cylinder banks of a V-block engine.

According to yet another aspect of the present invention, the turbocharger pedestal mounting pad of the utility pedestal comprises a number of mounting bosses having fastener bores extending therethrough at an acute angle with respect to horizontal plane such that fasteners inserted within the bores pass inboard to threaded bores formed in the hard point associated with the cylinder block.

According to another aspect of the present invention, the return, or waste, oil passage extending from the turbocharger and through the utility pedestal is designed to prevent foamed or frothed oil flowing from the turbocharger from impairing engine lubrication. This is accomplished by preventing the waste oil from contacting moving parts within the engine as the oil flows back to the crankcase sump. Stated another way, the return oil passage is routed such that contact between waste oil flowing from the turbocharger and moving parts of the engine is minimized prior to de-aeration of the waste oil.

It is an advantage of the present turbocharger system that the life of an engine to which the present turbocharger and pedestal are assembled will have enhanced useful life because the waste oil leaving the turbocharger is not permitted to come into contact with moving parts within the engine before de-aeration in the engine's lubrication system.

It is another advantage of a turbocharging system according to the present invention that the turbocharger system, including the turbocharger and the utility pedestal, with its oil and coolant utilities, is compact and ideally suited for mounting in the valley of a V-block internal combustion engine.

It is yet another advantage of a turbocharging system according to the present invention that the noise signature of the turbocharger will be reduced because of the stiffness inherent with the close mounted utility pedestal featured in the present invention.

It is yet another advantage of the present invention that the fasteners used to mount the pedestal to the engine may be accessed without removing portions of the turbocharger.

Other advantages, as well as features of the present invention, will become apparent to the reader of this specification.

DETAILED DESCRIPTION OF THE PREFERRED EMBODIMENTS

Figure 1:
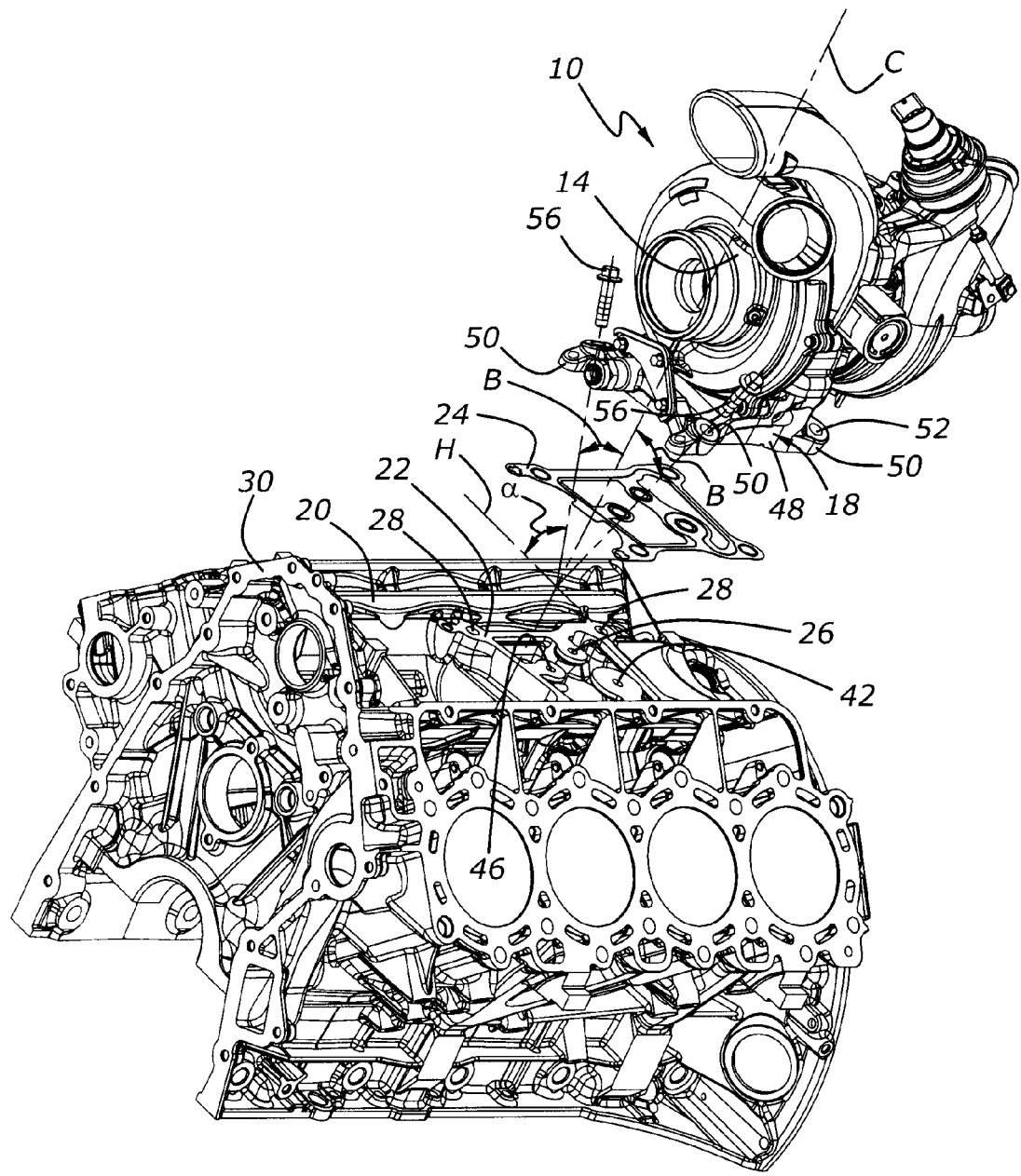
FIG. 1 is an exploded perspective view of an engine having a turbocharger system according to the present invention.
Figure 6:
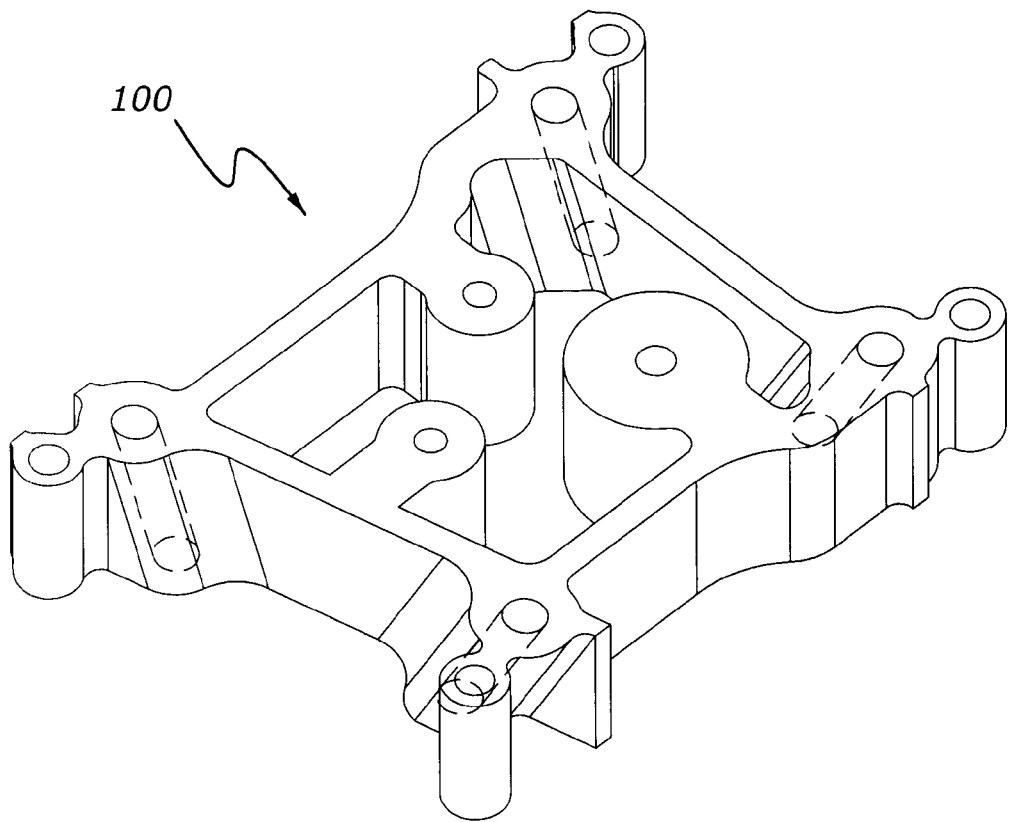
FIG. 6 is a perspective view of a turbocharger mounting hard point configured as a plate suitable for bolting or welding to an engine cylinder block.

As shown in FIG. 1, turbocharger system 10 includes a turbocharger, 14, and a utility pedestal 18. Turbocharger 14 is preferably mounted to utility pedestal 18 before turbocharger 14 is mounted upon an engine. FIG. 1 also shows a metallic cylinder block, 30, having a valley, 20, into which turbocharger system 10 is placed upon a hard point, which is illustrated as generally planar mounting pad 22. Utility pedestal 18 provides rigid structural support for turbocharger 14; this helps to reduce unwanted engine noise emissions, as well as reducing unwanted vibration associated with the turbocharger. Those skilled in the art will appreciate in view of this disclosure that the term "hard point", as used herein means either a structurally rigid mounting location such as block pad machined into the parent metal of a cylinder block, or a separate pad or bracket, such as that illustrated at 100 in FIG. 6. Mounting pad 100 is intended to be attached to an engine by bolting, or welding, or by some other suitable process.

Utility pedestal 18 has a mounting pad, 48, at its lower extremity. Mounting pad 48 includes mounting bosses 50, which have fastener bores 52. Fastener bores 52 extend through mounting bosses 50 and make an acute angle, α, with a horizontal plane, H (FIG. 1). Fastener bores 52 allow the passage of a number of threaded fasteners, 56, which pass through fastener bores 52 and into threaded bores, 28, formed in generally planar mounting pad 22 of cylinder block 30. Two of threaded bores 28 are shown in FIG. 1. FIG. 1 further shows that mounting bosses 50 are angled so that threaded fasteners or bolts 56 extend inboard into bolt holes 28 formed in mounting pad 22 of cylinder block 30. This geometry is also shown in FIG. 2.

Figure 2:
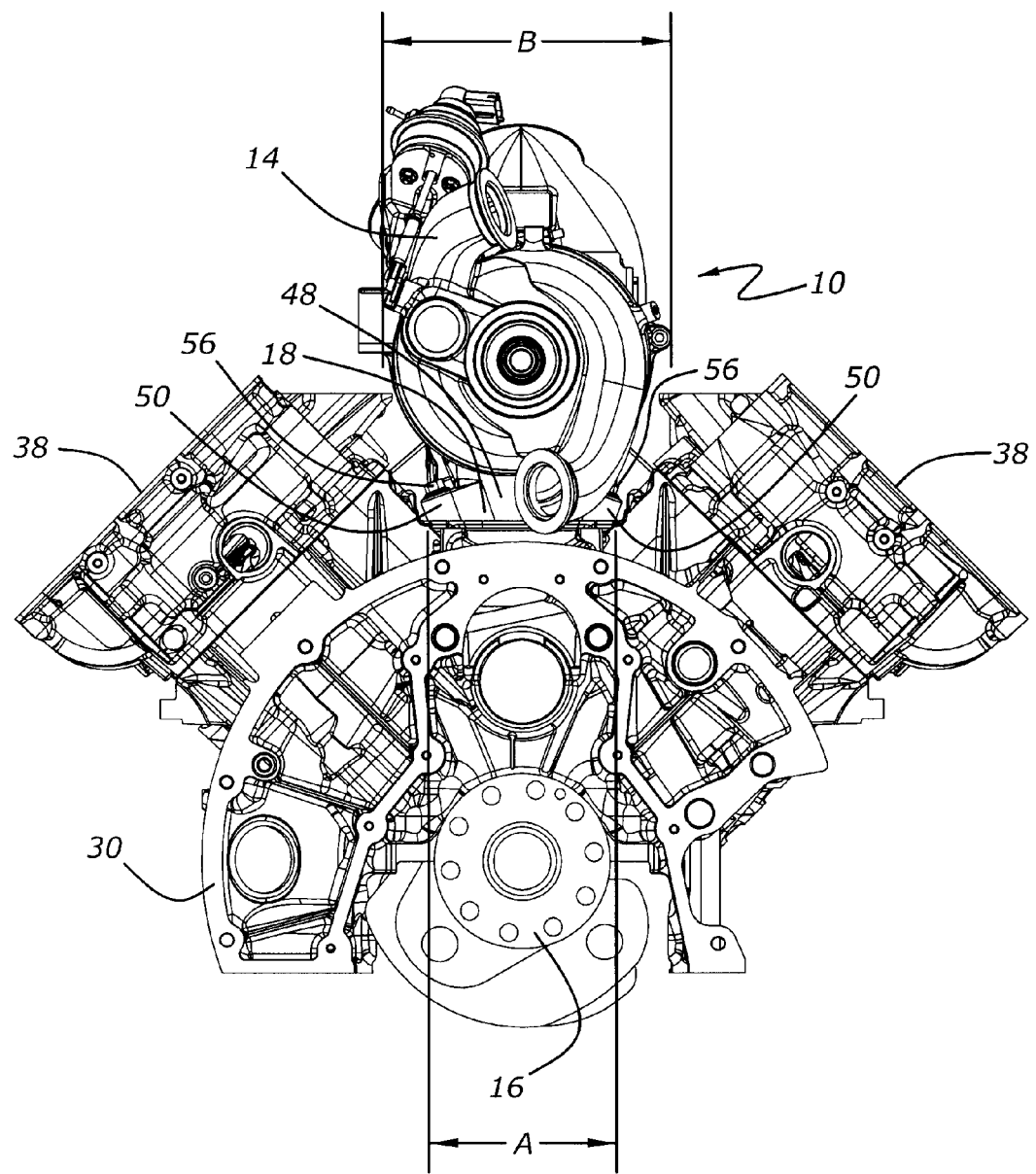
FIG. 2 is an end view, partially cut away, of a portion of an engine having a turbocharger system according to the present invention.

As seen in FIG. 2, the width, A, of utility pedestal mounting pad 48 is less than the overall width, B, of turbocharger 14. This is an added benefit stemming from the angular orientation of fastener bores 52, which fortuitously permit turbocharger 14 and utility pedestal 18 to be disassembled as one unit from the engine without removing portions of the turbocharger assembly. The angles of fastener bores 52 also allow turbocharger 14 to be mounted closer to cylinder block 30, in a vertical direction closer to crankshaft 16. FIG. 2 shows turbocharger 14 nestled in valley 20 between cylinder heads 38 and cylinder block 30.

Figure 3:
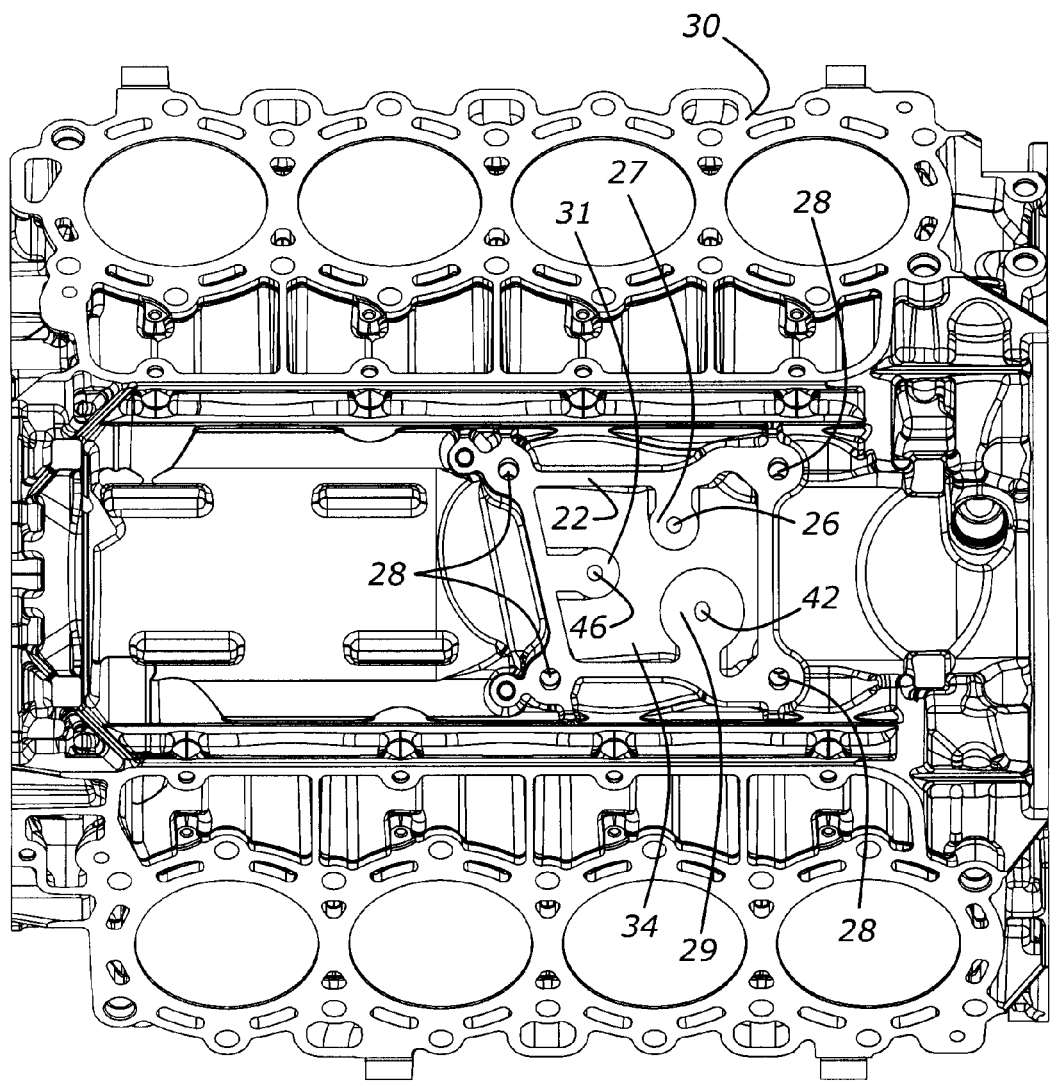
FIG. 3 is a plan view of an engine block showing a turbocharger pedestal mounting pad and utility passages for lubricating oil and coolant according to an aspect of the present invention.

FIG. 3 shows generally planar mounting pad 22 as being located in the mid-portion of the valley of cylinder block 30. Several of threaded mounting bolt holes 28 are shown. FIG. 3 further illustrates several utilities for turbocharger 14. The first such utility, oil supply passage 26, is shown as terminating in a port formed within the planar surface of mounting pad 22. Coolant supply passage 42 also communicates with this surface, as does coolant return 46. In other words, portions of oil supply passage 26, coolant supply passage 42, and coolant return passage 46 are all co-planar with the uppermost surface of mounting pad 22. As a result, all of these utilities may be sealed to utility pedestal 18 with a single gasket 24, which is shown in FIG. 1. Gasket 24 is illustrated as a unitary carrier incorporating a number of integral o-rings for sealing passages 26, 42, and 46.

Figure 4:
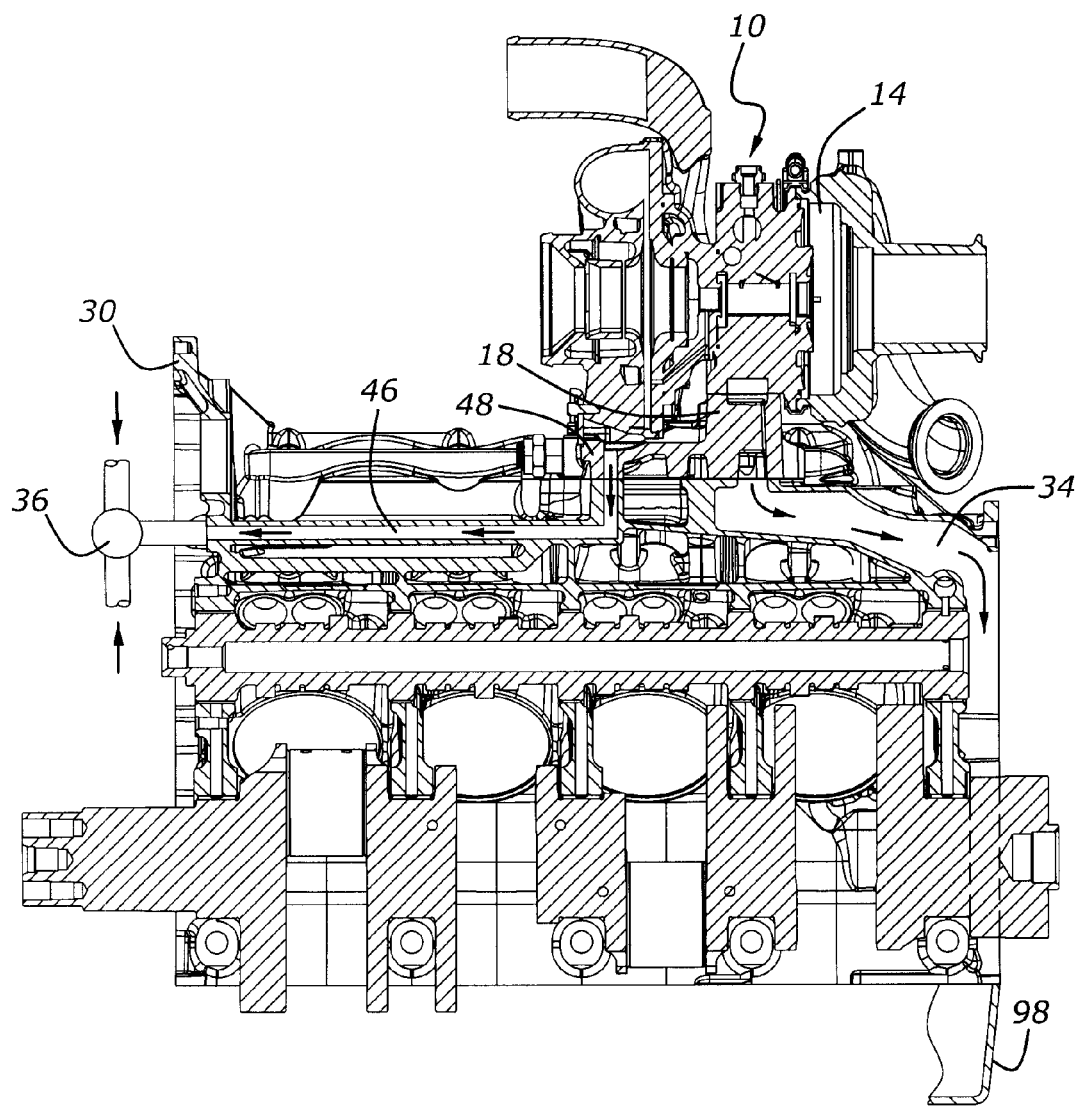
FIG. 4 is a side elevation, partially cut away, of an engine having a turbocharger system according to the present invention and showing the routing for several of the utility passages for oil and water according to the present invention.

Only the uppermost part of return oil isolation passage 34 within cylinder block 30 is shown in FIG. 3; for more definition, one must look to FIG. 4, wherein return oil passage 34 is shown as leading to one end of engine block 30 and down into crankcase sump 98 through a route in which there are no rotating or moving parts. As noted above, the drainback of waste oil from turbocharger 14 to crankcase sump 98 through areas of the engine devoid of moving parts prevents galling or overheating of such moving parts by preventing contact between parts needing lubrication and temporarily aerated oil flowing from turbocharger 14. Those skilled in the art will appreciate in view of this disclosure that oil return passage 34 may be configured either from the parent metal of cylinder block 30, as a cored or machined passage through cylinder block 30, as shown in the various figures, or as a fabricated passage, or both, so as to take advantage of available space and material within cylinder block 30, while adding only a minimum number of components. Those skilled in the art will further appreciate that the term "waste oil", as used herein, means lubricating oil which has been furnished to turbocharger 14 and is then returned to the crankcase sump for re-use.

Figure 5:
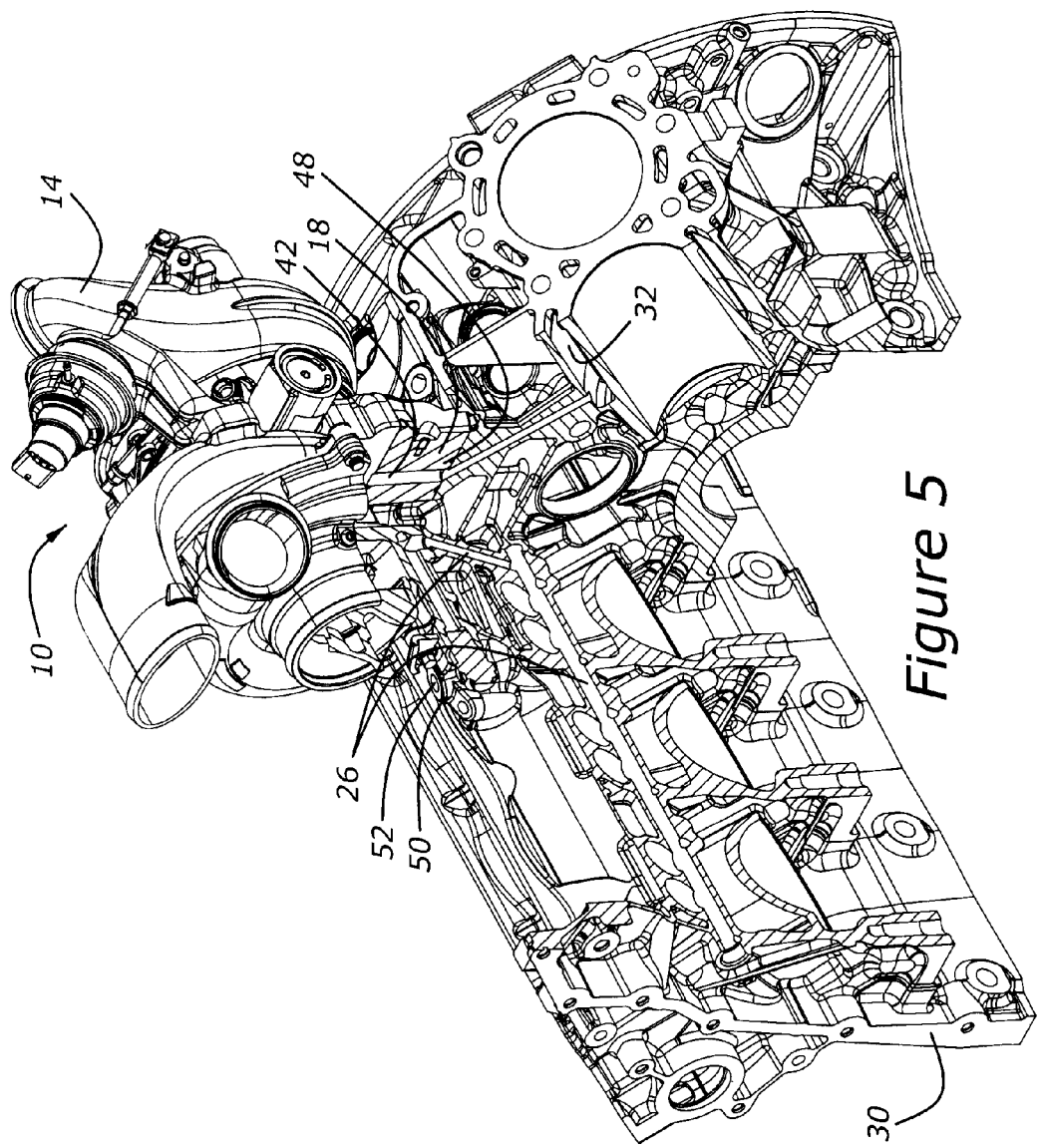
FIG. 5 is a side perspective view, partially cut away, of an engine having a turbocharger system according to the present invention.

FIGS. 4 and 5 show oil supply passage 26 extending up into utility pedestal 18 from within cylinder block 30. Further, FIG. 5 shows coolant supply passage 42, which extends into utility pedestal 18 from an engine water jacket, 32. Coolant supply passage 42 furnishes pressurized coolant to turbocharger 14. Coolant leaving turbocharger 14 flows through coolant return passage 46 down through utility pedestal 18 and out to the front of engine block 30, wherein the flow is joined with coolant flow from one or more cylinder heads at a combination point 36. Coolant return passage 46 may advantageously be configured as a cored or drilled passage within cylinder block 30. Those skilled in the art will appreciate in view of this disclosure that combination point 36 could be configured as a water outlet or coolant surge tank or other device for combining coolant flows from more than one source, such as one or more of the engine's cylinder heads. This combination of flows offers the advantage of mitigating coolant temperature excursions which could otherwise result from the very warm coolant leaving turbocharger 14.

Figure 7:
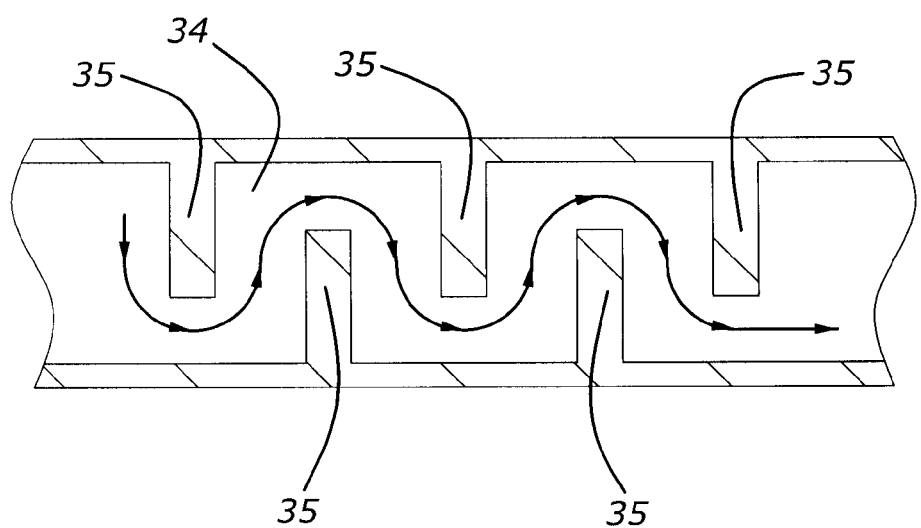
FIG. 7 is a plan view of an isolated turbocharger oil drainback passage, taken along the line 7-7 of FIG. 4.

FIGS. 4 and 7 show a series of baffles, 35, which are incorporated within oil return passage 34. The serpentine path illustrated in FIG. 7 promotes de-aeration of oil flowing from turbocharger 14 to sump 98.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A turbocharger system for an engine having a cylinder block, with said turbocharger system comprising:
   a turbocharger; and
   a utility pedestal extending between the turbocharger and a mounting pad positioned upon the cylinder block within a valley associated with the engine, said utility pedestal comprising:
      a return oil passage having at least a portion within said pedestal and at least an uppermost part located within the cylinder block, for conveying lubricating oil from the turbocharger to the engine, with said return oil passage having a plurality of baffles.

2. A turbocharger system according to claim 1, further comprising a coolant supply passage for conveying coolant under pressure to the turbocharger, and a coolant return passage configured, at least in part within said utility pedestal, for conveying coolant from the turbocharger to a cooling system incorporated within the engine.

3. A turbocharger system according to claim 1, wherein at least a portion of said return oil passage is configured from parent metal within the cylinder block comprising a portion of the engine.

4. A turbocharger system according to claim 3, wherein the plurality of baffles are provided to promote de-aeration of oil flowing through the return oil passage.

5. An engine, comprising:
   a V-block configured cylinder block;
   a plurality of cylinder heads attached to said cylinder block, with said cylinder heads and said cylinder block defining a valley between the cylinder heads;
   a generally planar mounting pad positioned upon said cylinder block within said valley; and
   a turbocharger mounted upon a utility pedestal extending between the turbocharger and the generally planar mounting pad, with said utility pedestal comprising:
      a utility pedestal mounting pad for the utility pedestal;
      an oil supply passage for conveying lubricating oil under pressure from the cylinder block to the turbocharger;
      an internal, isolated turbocharger oil drainback passage, located at least in part within said utility pedestal and at least in part within the cylinder block, for conveying waste lubricating oil from the turbocharger to a lubrication system incorporated within the engine, with said drainback passage being routed such that contact between waste oil flowing from said turbocharger and moving parts of the engine is minimized prior to de-aeration of the waste oil.

6. An engine according to claim 5, wherein at least a portion of said drainback passage is configured from parent metal within said cylinder block.

7. An engine according to claim 5, wherein at least a portion of said drainback passage extending within said cylinder block is baffled to promote de-aeration of oil flowing through the drainback passage.

8. An engine according to claim 5, wherein said drainback passage conveys oil from said turbocharger to a crankcase sump of the engine.

9. An engine according to claim 5, wherein said utility pedestal further comprises a coolant supply passage for furnishing pressurized coolant to said turbocharger.

10. An engine, comprising:
    a cylinder block;
    a generally planar mounting pad positioned upon the cylinder block within a valley defined by cylinder heads; and
    an internal, isolated turbocharger oil drainback passage, located at least in part within said cylinder block and within the mounting pad, for conveying waste lubricating oil from the mounting pad to a lubrication system incorporated within the engine.

11. An engine according to claim 10, wherein at least a portion of said drainback passage is configured from parent metal within said cylinder block.

12. An engine according to claim 10, wherein at least a portion of said drainback passage extending within said cylinder block is baffled to promote de-aeration of oil flowing through the drainback passage.

13. A turbocharger system according to claim 1, further comprising:
    an oil supply passage for conveying lubricating oil under pressure from the engine to the turbocharger.

14. A turbocharger system according to claim 1 wherein the lubricating oil from the turbocharger to the engine is provided to a lubrication system incorporated within the engine.

15. A turbocharger system according to claim 1 wherein the plurality of baffles are provided to de-aerate the lubricating oil from the turbocharger prior to the lubricating oil contacting moving parts of the engine.

16. A turbocharger system according to claim 1 wherein the return oil passage is routed such that contact between waste oil flowing from said turbocharger and moving parts of the engine is minimized prior to de-aeration of the waste oil.

17. An engine according to claim 5, further comprising a coolant supply passage for conveying coolant under pressure to the turbocharger, and a coolant return passage configured at least in part within said utility pedestal, for conveying coolant from the turbocharger to a cooling system incorporated within the engine.

18. An engine according to claim 10, wherein said drainback passage is routed such that contact between said waste oil and moving parts of the engine is minimized prior to de-aeration of the waste oil.

19. An engine according to claim 10, further comprising a coolant supply passage for conveying coolant under pressure to a turbocharger mounted upon a utility pedestal, and a coolant return passage configured at least in part within said utility pedestal, for conveying coolant from the turbocharger to a cooling system incorporated within the engine.

20. An engine according to claim 19, further comprising an oil supply passage for conveying lubricating oil under pressure from the engine to the turbocharger.

* * * * *